(No Model.)
W. MURCHLAND.
APPARATUS FOR MILKING COWS.
No. 501,804. Patented July 18, 1893.
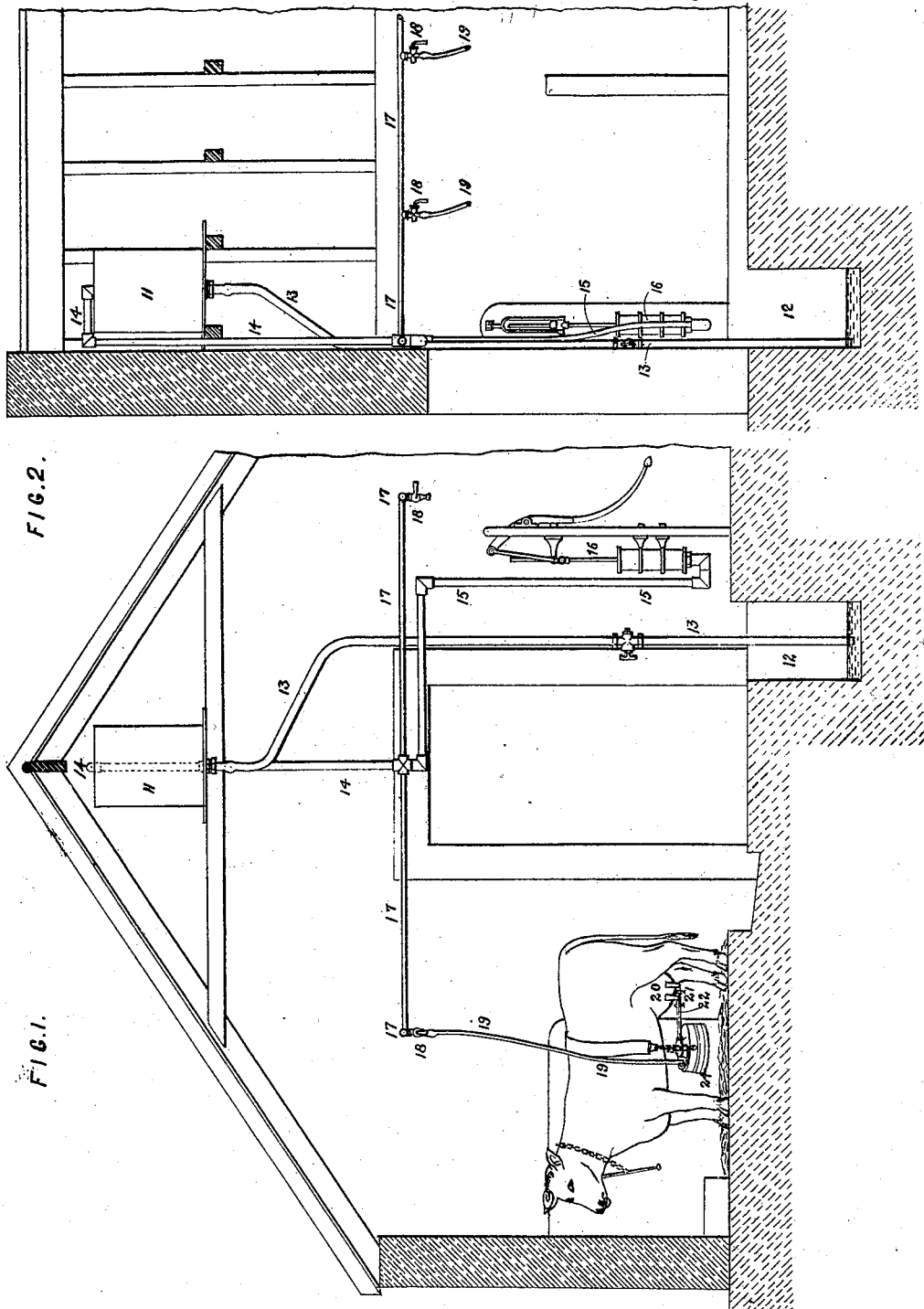
Witnesses
John Revell
George Baumann
Inventor
William Murchland
By his Attorneys
Howson and Howson

UNITED STATES PATENT OFFICE.

WILLIAM MURCHLAND, OF KILMARNOCK, SCOTLAND.

APPARATUS FOR MILKING COWS.

SPECIFICATION forming part of Letters Patent No. 501,804, dated July 18, 1893.

Application filed February 3, 1891. Serial No. 380,051. (No model.) Patented in England September 27, 1889, No. 15,210, and in France July 9, 1890, No. 206,887.

*To all whom it may concern:*

Be it known that I, WILLIAM MURCHLAND, a subject of the Queen of Great Britain and Ireland, and a resident of Kilmarnock, county of Ayr, Scotland, have invented certain Improvements in the Milking of Cows and Apparatus Therefor, (for which I have obtained British Letters Patent, dated September 27, 1889, No. 15,210, and French patent, dated July 9, 1890, No. 206,887,) of which the following is a specification.

My said invention consists of an improved means for milking cows, and so that while operating more naturally and less roughly, to be more economical than the ordinary milking process.

In carrying out my invention suction is applied to the cow's teats, but one special feature of my arrangements is that the milk is not drawn through a pump. According to another important feature of my invention the degree of suction or vacuum which is used is regulated by a column of liquid. Pumping or equivalent means is employed to produce the suction, being in some cases required only when starting the milking operation.

On an accompanying sheet of drawings Figures 1, and 2, are sectional elevations at right angles to each other of my apparatus applicable to existing byres of a common kind.

According to my invention I arrange two tanks, 11, 12, connected by a pipe, 13, with one, 11, at the distance above the other of about twelve feet or at such a height as to allow of there being a column of water in the pipe and tanks corresponding to the degree of vacuum or sucking action which it is considered desirable to apply to the cow's teats. The upper tank, 11, which is otherwise closed, has connected to its top a pipe, 14, a branch pipe, 15, by which it is connected to a pump, 16; and the pipe, 14, also communicates with main pipes, 17, extending along over the stalls of the byre, and having stopcocks, 18, to which branch flexible pipes, 19, can be attached. When the pump, 16, is worked it draws air from the upper tank, 11, and from the pipes, 14, 17, and also from any flexible branch pipe, 19, when its stopcock, 18, is open; but the degree of vacuum cannot exceed what corresponds to the column of water in the pipe, 13, connecting the upper and lower tanks, 11, 12, because air would pass up the pipe, 13, immediately on the intended degree of vacuum being exceeded.

Mouthpieces or teat cups, 20, are provided for application to the cow's teats. Each teat cup, 20, is fitted with a stopcock, 21, on the nozzle of which a short length of flexible tubing, 22, can be secured. The other ends of the tubes, 22, are secured to a milk receptacle or collector, 24. The combination of teat cups, 20, and milk receptacle, 24, forms the subject of Letters Patent of the United States No. 473,770, dated April 26, 1892, and is therein fully described.

The sucking action or exhaustion may be produced in any suitable known way provided that the degree of vacuum is regulated by means of a column of liquid of suitable vertical length, whereby the degree of vacuum is prevented from becoming excessive. For example the upper tank, 11, may be nearly filled with water by pumping,—or by gravitation where a supply by gravitation is available,—the column pipe, 13, being closed while filling the tank, 11, and provision being made for the escape of air. Then when the apparatus is to operate, any openings by which air might re-enter being closed, the stopcock on the pipe, 13, is opened and the water flowing down that pipe produces the required sucking action. In many cases it will be convenient to provide two upper tanks, 11, with connecting pipes and stop-cocks arranged so that one may be filled while the other is in action and being emptied.

It will be understood that while the degree of suction may not be absolutely constant, it is maintained approximately uniform so as to practically regulate the suction to a degree such as is due to the action of a column of water of about twelve feet. In the case where the suction or exhaustion is produced by first nearly filling the upper tank 11 with water by pumping and then allowing it to flow out, as above described, the water pump (not the air pump 16) may be used to supply water to the tank 11 either without intermission or at shorter or longer intervals, dependent upon the capacity of the apparatus and particularly upon the size of tank 11 employed.

When the air pump 16 is employed to produce the sucking action, the automatic regulating effect due to the column of water in the pipe 13 may be maintained more nearly constant.

Where the situation of a byre or milking station is conveniently such that a fall of about twelve feet below the milking floor is obtainable, the production of suction in the apparatus by means of the pump, 16, will be required only at starting the operation. In applying my invention in such a situation separate milk receptacles, one for each cow, will not be used, but the several sets of teat cups will be connected to a main pipe leading to one general receptacle at the lower level and the column of liquid (of a height of about twelve feet) which will maintain and regulate the suction will be that of the milk itself.

It will be seen that by my invention the defects heretofore existing in this class of devices is entirely overcome, because the injurious action upon the cows is wholly prevented by keeping the suction down to that point which I have found by experiment to accomplish the object sought.

I claim as my invention—

1. In a milking apparatus operated by suction the combination with the air exhausting apparatus, of one or more milk receptacles and a liquid column for automatically preventing excess of suction, said column being separate and distinct from the milk receptacles whereby the milk is drawn without admixture with the controlling liquid in said column, substantially as described.

2. The combination of a milking apparatus adapted to be worked by suction with means for regulating the degree of suction, independent of the milk receptacles said means consisting of a downwardly extending pipe having its upper end connected to parts of the apparatus in which the suction acts, its lower end being open when the apparatus is in operation and such pipe being of a length to contain a liquid column of an effective height (such as twelve feet) corresponding to the maximum degree of suction intended to be applied, substantially as described.

In testimony whereof I have signed my name to this specification in the presence of two subscribing witnesses.

WILLIAM MURCHLAND.

Witnesses:
 EDMUND HUNT,
 DAVID FERGUSON.